US009723253B2

(12) United States Patent
Tsujimoto

(10) Patent No.: US 9,723,253 B2
(45) Date of Patent: Aug. 1, 2017

(54) APPARATUS AND METHOD FOR AUTOMATICALLY GENERATING AN OPTICALLY MACHINE READABLE CODE FOR A CAPTURED IMAGE

(71) Applicant: Sony Computer Entertainment Inc., Tokyo (JP)

(72) Inventor: Takuhito Tsujimoto, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 14/645,294

(22) Filed: Mar. 11, 2015

(65) Prior Publication Data
US 2016/0269675 A1 Sep. 15, 2016

(51) Int. Cl.
G06K 19/06 (2006.01)
H04N 5/77 (2006.01)
G11B 27/10 (2006.01)
G06K 1/12 (2006.01)
H04N 9/82 (2006.01)

(52) U.S. Cl.
CPC .......... *H04N 5/772* (2013.01); *G06K 1/126* (2013.01); *G06K 19/06009* (2013.01); *G11B 27/10* (2013.01); *H04N 9/8233* (2013.01)

(58) Field of Classification Search
CPC ......... G06F 17/30038; G06F 17/30047; G06F 17/3028; G06F 17/30879; G06K 19/06103; G06K 19/06028; G06K 19/06009; G06K 1/126; H04N 2201/3269; H04N 9/8233

USPC ......................................... 235/494
See application file for complete search history.

(56) References Cited

U.S. PATENT DOCUMENTS

| 6,173,445 | B1 | 1/2001 | Robins |
| 7,798,908 | B2 | 9/2010 | Borgs |
| 8,591,339 | B2 | 11/2013 | Santhosh |
| 8,903,120 | B1 | 12/2014 | Peasley |
| 2002/0122058 | A1 | 9/2002 | Kutaragi |
| 2003/0030834 | A1* | 2/2003 | Parry ................ H04N 1/00244 358/1.14 |
| 2003/0078101 | A1 | 4/2003 | Schneider |
| 2004/0224741 | A1 | 11/2004 | Jen |
| 2004/0230786 | A1 | 11/2004 | Kim |

(Continued)

FOREIGN PATENT DOCUMENTS

WO  2014035998  3/2014

OTHER PUBLICATIONS

Patent Cooperation Treaty; "International Search Report" issued in foreign application No. PCT/US10/34250, mailed Jul. 12, 2010, 3 pages.

(Continued)

*Primary Examiner* — Claude J Brown
(74) *Attorney, Agent, or Firm* — Fitch, Even, Tabin & Flannery, LLP

(57) ABSTRACT

A method for generating optically machine readable code is provided. The method includes capturing an image with a user device, automatically generating, by the user device, an optically machine readable code comprising information about the image recorded during the capturing of the image, and associating the optically machine readable code and the image. A computer readable storage medium storing one or more programs and an apparatus are also provided.

18 Claims, 5 Drawing Sheets

(56) References Cited

U.S. PATENT DOCUMENTS

| | | |
|---|---|---|
| 2005/0026700 A1 | 2/2005 | Blanco |
| 2005/0070359 A1 | 3/2005 | Rodriquez |
| 2005/0072846 A1* | 4/2005 | Lubow .................. G06K 19/14 235/462.01 |
| 2005/0109846 A1* | 5/2005 | Lubow ............. G06K 19/06028 235/462.01 |
| 2005/0246565 A1 | 11/2005 | Koarai |
| 2006/0206700 A1 | 9/2006 | Umedu |
| 2006/0215931 A1* | 9/2006 | Shimomukai .......... G06K 1/121 382/284 |
| 2006/0252503 A1 | 11/2006 | Salter |
| 2007/0099694 A1 | 5/2007 | McCarthy |
| 2007/0234215 A1* | 10/2007 | Graham ............. G06F 17/3005 715/723 |
| 2008/0023546 A1* | 1/2008 | Myodo ............ G06K 19/06046 235/462.04 |
| 2008/0274798 A1 | 11/2008 | Walker |
| 2009/0048022 A1 | 2/2009 | Iddings |
| 2009/0124376 A1 | 5/2009 | Kelly |
| 2010/0076976 A1* | 3/2010 | Sotirov ............ G06F 17/30241 707/737 |
| 2010/0198876 A1* | 8/2010 | Estok ................ G06F 17/30038 707/793 |
| 2010/0293365 A1 | 11/2010 | Tandon |
| 2010/0306773 A1 | 12/2010 | Lee |
| 2011/0081964 A1 | 4/2011 | Acres |
| 2011/0130197 A1 | 6/2011 | Bytnar |
| 2011/0165933 A1 | 7/2011 | Guziel |
| 2011/0207531 A1 | 8/2011 | Gagner |
| 2012/0122558 A1 | 5/2012 | Lyons |
| 2012/0133638 A1* | 5/2012 | Davison .................. G06T 17/00 345/419 |
| 2012/0185066 A1* | 7/2012 | Kern ........................ G06T 15/30 700/91 |
| 2012/0273579 A1* | 11/2012 | Cok .................. G06F 17/30047 235/494 |
| 2012/0274970 A1 | 11/2012 | Cok |
| 2013/0005489 A1 | 1/2013 | Santhosh |
| 2013/0037605 A1* | 2/2013 | Cok .................. G06F 17/30879 235/375 |
| 2013/0185815 A1 | 7/2013 | Leotsarakos |
| 2013/0215473 A1* | 8/2013 | Fan .................. G06K 19/06103 358/3.28 |
| 2013/0228629 A1* | 9/2013 | Fan .................. G06K 19/06103 235/494 |
| 2013/0301870 A1* | 11/2013 | Mow ..................... G06T 1/0021 382/100 |
| 2013/0308772 A1* | 11/2013 | Rodriguez Marchant .................. H04L 9/28 380/28 |
| 2014/0135120 A1 | 5/2014 | Knutsson |
| 2014/0313352 A1 | 10/2014 | DeRosa |

OTHER PUBLICATIONS

Patent Cooperation Treaty; "Notification of Transmittal of the International Search Report and the Written Opinion of the International Searching Authority, or the Declaration" issued in foreign application No. PCT/US10/34250, mailed Jul. 12, 2010, 2 pages.

Patent Cooperation Treaty; "Written Opinion of the International Searching Authority" issued in foreign application No. PCT/US10/34250, mailed Jul. 12, 2010, 8 pages.

USPTO; Advisory Action issued in U.S. Appl. No. 13/172,809, mailed Apr. 22, 2013, 3 pages.

USPTO; Final Office Action issued in U.S. Appl. No. 13/172,809, mailed Feb. 4, 2013, 9 pages.

USPTO; Notice of Allowance issued in U.S. Appl. No. 13/172,809, mailed Jul. 9, 2013.

USPTO; Office Action issued in U.S. Appl. No. 12/466,223, mailed Oct. 3, 2011, 14 pages.

USPTO; Office Action issued in U.S. Appl. No. 13/172,809, mailed Sep. 19, 2012, 8 pages.

Wikipedia; "QR Code", https://en.wikipedia.org/wiki/QR_code, archived on Feb. 11, 2016, pp. 1-12.

Patent Cooperation Treaty; "International Search Report" issued in corresponding PCT Application No. PCT/US16/18698, dated Apr. 25, 2016, 2 pages.

Patent Cooperation Treaty; "Notification of Transmittal of the International Search Report and the Written Opinion of the International Searching Authority, or the Declaration" in corresponding PCT No. PCT/16/018698, dated Apr. 25, 2016, 2 pages.

Patent Cooperation Treaty; "Written Opinion of the International Searching Authority" issued in corresponding PCT Application No. PCT/US16/18698, dated Apr. 25, 2016, 12 pages.

* cited by examiner

APPARATUS AND METHOD FOR AUTOMATICALLY GENERATING AN OPTICALLY MACHINE READABLE CODE FOR A CAPTURED IMAGE

BACKGROUND OF THE INVENTION

1. Field of the Invention

The present invention relates generally to image captures, and more specifically to digital image captures.

2. Discussion of the Related Art

Digital cameras have become very popular. A digital camera is capable of capturing an image and storing it in digital format. Digital cameras may comprise stand alone or dedicated devices, or digital cameras may be incorporated into devices such as smart phones, mobile phones, tablet computers, pad-like computers, notebook computers, desktop computers, etc. Some conventional digital cameras embed metadata in the images they capture. However, such image metadata is generally only readable by specialized software.

Another way to capture an image is by way of a screenshot or screen capture. A screenshot or screen capture is a digital image file that shows the screen of a computer, smart phone, mobile device, tablet computer, pad-like computer, or other device, at the moment of capture.

SUMMARY OF THE INVENTION

One embodiment provides a method comprising: capturing an image with a user device; automatically generating, by the user device, an optically machine readable code comprising information about the image recorded during the capturing of the image; and associating the optically machine readable code and the image.

Another embodiment provides a non-transitory computer readable storage medium storing one or more programs that causes a processor based system to execute steps comprising: capturing an image with a user device; automatically generating, by the user device, an optically machine readable code comprising information about the image recorded during the capturing of the image; and associating the optically machine readable code and the image.

Another embodiment provides an apparatus comprising: an image capture device configured to capture an image; a processor configured to automatically generate an optically machine readable code comprising information about the image recorded during the capturing of the image, and associate the optically machine readable code and the image; and a non-transitory computer readable storage medium configured to store the image and the optically machine readable code.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Figure 1:
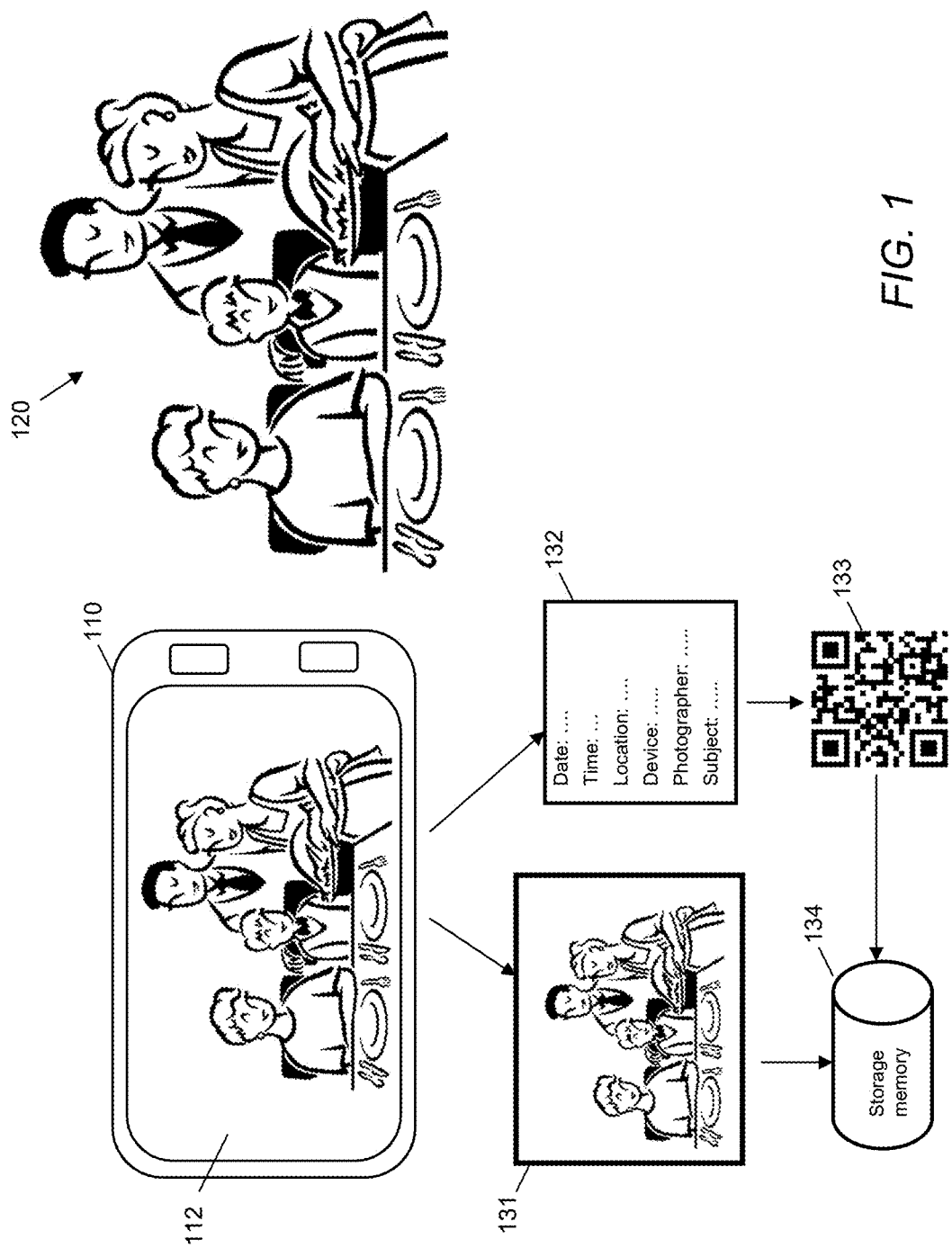
FIG. 1 is a diagram illustrating a capturing of a real-world scene in accordance with some embodiments of the present invention.

After a photograph is taken, such as with a digital camera, information such as the time when the photo was taken, the location where the photo was taken, or the person(s) in the picture can be forgotten. When a photograph is printed out, it could also be difficult to know such information unless it is hand written on the back of picture. Even though photos are often stored digitally now, custom albums and picture books are still great ways to keep and share photos with others.

The present disclosure provides a user device that can generate machine readable code, such as a quick response (QR) Code, which encodes information relating to a captured image. In some embodiments, the optically machine readable code can either be included directly in the photo (frames/margins), somewhere in a picture book page, or it can be printed out separately on a piece of paper. The optically machine readable code may be read by a software application which can show additional information relating to the image, such as an integrated online map (e.g. Google® map), the capture time, capturing camera information, etc. The optically machine readable code data can also be decoded and printed in some cases.

Additionally, in some embodiments a similar concept is used with screenshots, such as video game screenshots. The optically machine readable code can encode information about which game was being played, who was playing the game, and when the game was played, such that others can learn about the game by reading the optically machine readable code with a software application. Furthermore, if a game is integrated with the system, it could encode game information such as where in the game map the picture is taken and which character, etc., such that when another person reads the data during game play, the game can show the corresponding in-game location in the map.

In some embodiments, when a photo is taken by a device such as a camera or a smartphone, it may automatically encode additional information such as the location, the time, the device, people related to the picture, etc. The information about people can be the person who is taking the picture or the people who are in the picture. Names of the people can be entered manually as an option. In some embodiments, the device is able to identify the people by learning their names and faces so that it can encode the information automatically. For the location data, if Global Positioning System (GPS) is not available, the information may optionally be entered manually as well. This method and apparatus described herein prevents losing such information since the encoded information can be easily applied to the photograph in different ways. It eliminates the needs of recording such information by hand and enables sharing the information in digital format which can be easily used to present the information with rich interfaces. The format of encoded data can be in the QR code format or other similar formats which can be read by other devices with an optical sensor.

There are several ways of applying the data to the photograph. One way is to directly blend it on the photograph with the device. Another way is that the optically machine readable code can be printed out separately. And yet another way is that it can be recorded as a frame of the photo. These are just a few examples and it should be well understood that the data may be applied or associated with the photograph in many other ways in accordance with various embodiments of the present invention. A software application may be used to read the encoded data and decode it to display the information. The information may be displayed in document style formatted layout with a map, or it may be overlaid on the screen of the device which is reading the data to create an effect of augmented reality, or it may be displayed in some other manner. Optionally, the encoded data may be stored by the device in text format for difference usages.

In the case of taking a screenshot of game play, the device may record which game is being played and the player's information. If a game is integrated with the system, it may encode game character information, the location of the map in the game, the time in the game, and other information. Then the encoded data may be shared along with the screenshot. The data may be read and displayed in the game. For example, the location of the screenshot may be marked on the game map. This convenient way of exchanging information can increase player interaction.

In some embodiments, encoders and decoders may be developed as software which can be used on various platforms. Also, custom decoders and encoders may be developed. For example, a game developer may develop a specific encoder/decoder for game play screenshots.

A more detailed description will now be provided. Referring first to FIG. 1, there is illustrated a device capturing an image of a real-world scene in accordance with some embodiments of the present invention. In FIG. 1, a user device 110, including a view finder and/or a display screen 112, is used to capture an image of a real-world scene 120. The user device 110 may be any device configured to capture an image such as a camera, a Smartphone, a wearable computer, a tablet computer, a laptop computer, a desktop computer connected to a camera, and the like. Generally, the user device 110 includes an image sensor and a processor.

When a user captures an image of the real-world scene 120 with the user device 110, the user device 110 generates and stores an image file 131 and information data 132 relating to the image recorded when the image file 131 is captured. The information data 132 may include one or more of: the capture date, the capture time, the captured location, the capturing device, the photographer of the image, and the subject of the image, etc.

The capture date and time may be based on the user device's internal clock. The location information may be based on a signal received by a GPS and/or a wireless receiver of the user device 110. The location information may include one or more of a location name (e.g., New York, Grand Canyon, Joe's Italian Restaurant, etc.), GPS coordinate, zip code, and the like.

The device information may be provided by the device's internal memory. The device information may identify the make and model of the device (e.g., Sony Alpha 7, Sony Xperia, etc.) and/or the unique device. For example, the device information may include the serial number of the user device 110 and/or a description of the user device 110 (e.g. John Doe's Xperia Z2).

The photographer information may also be provided by the user device's internal memory. In some embodiments, the photographer information is based on a user profile of a user account associated with the user device and/or one or more applications running on the user device 110. In some embodiments, the photographer information may be previously entered and configured on the user device 110.

The subject information may include persons and/or items appearing in the photograph. In the example shown in FIG. 1, the names of the four people appearing in the image file 131 may be included in the information data 132. In some embodiments, the subjects of the photograph may be identified using facial recognition and/or object recognition algorithms. For example, the user device 110 and/or a remote server may compare facial features of a person in the image file 131 with other individuals who had been photographed by the same device and/or photographer to determine the photographed person's identity.

The information data 132 listed in FIG. 1 are provided as examples only, and other types of information relating to the captured image may also be included without departing from the spirit of the present disclosure. Generally, the information data 132 may include any information recorded in the metadata of an image file and any additional information configured and/or entered by a user. In some embodiments, some information relating to the image file 131 may be added, deleted, and/or modified after the image is captured.

When the image file 131 is captured, an optically machine readable code 133 may be automatically generated based on the information data 132. The information data 132 encoded into the optically machine readable code 133 may include all or a subset of the information data 132 recorded during the capture of the image file 131. The optically machine readable code 133 may include other previously recorded and/or entered information. In some embodiments, the user can pre-configure what information to include in the optically machine readable code 133. In some embodiments, the user may modify the information data 132 and/or select what information to include after the image is captured, and the user device may generate an optically machine readable code 133 according to the modified information and configuration. In some embodiments, the information included in the optically machine readable code 133 is automatically determined based on one or more of a default setting, user configuration, context information of the user device 110, and the subject of the captured image.

In some embodiments, the optically machine readable code 133 includes data readable by a software application to perform an action. The software application may be configured to perform actions based on the information data 132 and/or a unique identifier in the optically machine readable code 133. For example, an image viewer application which can decode the optically machine readable code 133 can be installed in the capturing device itself or other devices, and such applications can display the image with additional information such as maps, the location of the place, and names of the subjects. In some embodiments, the image viewer application may also be an image capture application.

In some embodiments, the optically machine readable code 133 includes a pointer to web based content associated with the image file 131. For example, the optically machine readable code 133 may include a universal resource locator (URL) or a unique identifier that can be interpreted by software or a website to direct a user to web content associated with the image file 131. The web based content may include at least part of the information data 132 and/or a digital copy of the image file 131. The web based content may further include a user interface for users to comment on, share, print, order a physical copy, and/or download the image file 131.

While the optically machine readable code 133 is shown as a QR code in FIG. 1, the optically machine readable code 133 may be one or more of a barcode, a linear barcode, a quick response (QR) code, an Aztec code, a high capacity color barcode, a matrix barcode, and the like. Generally, the optically machine readable code 133 may be any image encoding data that is optically readable by an optical or image sensor coupled to a processor based device and configured to provide the data encoded in the image to the processor based device. The optically machine readable code 133 may be generated by a software application, a firmware/operating system of the user device 110, and/or a plug-in component of an image capture software running on the user device 110. In some embodiments, the optically machine readable code may be generated, at least in part, by a remote server.

The image file 131 and the optically machine readable code 133 are associated with each other and stored in the storage memory 134. The storage memory 134 may be a local memory device of the user device 110, a removable memory, and/or cloud-based storage. The image file 131 and the optically machine readable code 133 may be stored as two separate but associated images or be combined into one image file for storage. In some embodiments, the image file 131 and the optically machine readable code 133 are stored such that a user can select and/or modify how the image file 131 and the optically machine readable code 133 are combined. Examples of images combining the image file 131 and the optically machine readable code 133 are provided with reference to FIG. 4 below.

Figure 2:
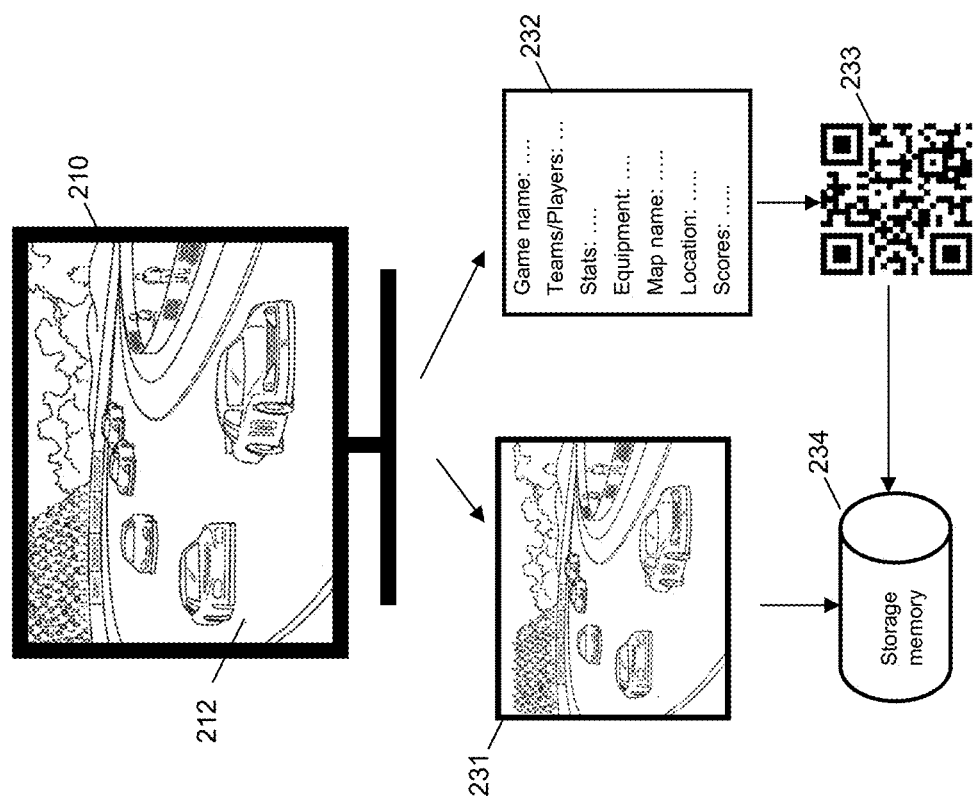
FIG. 2 is a diagram illustrating a capturing of a displayed image in accordance with some embodiments of the present invention.

Referring to FIG. 2, there is illustrated a device capturing an image of computer generated graphics in accordance with some embodiments of the present invention. The user device 210 may be any processor based device that is configured to render an image for display to a user. For example, the user device 210 may be one or more of a smartphone, a hand-held gaming device, a wearable computer, a game console, a laptop, a tablet computer, a desktop computer, and the like. In FIG. 2, the user device 210 has rendered for display, a displayed image 212 of a computer simulated car race. The displayed image 212 may be a scene in a computer simulation such as a single or multi-player computer game, a user interface of a software application, and/or other computer rendered graphic. Generally the displayed image 212 may be any image rendered by the operating system and/or a software program running on a user device.

A user may perform a screen capture to obtain an image of the displayed image 212. In some embodiments, screen capture may be performed using the built-in screen capture function of the operating system of the user device (e.g. pressing the "PrtScn" key in a Windows based device, pressing the power key and volume down key in a Android based device, and pressing the home and sleep/wake button in a iOS based device.). In some embodiments, screen capture may be performed using a screen capture function provided by the software program associated with the rendered image. For example, a computer game may have an in-game screen capture function (e.g. press F 11 to screencap) that allows player to save an in-game rendered scene as an image file. In some embodiments, a software application may initiate the screen capture.

When a screen is captured, an image file 231 of the displayed image 212 and information data 232 relating to the displayed image 212 are recorded. The information data 232 may include any state information of the software application providing and/or associated with the displayed image 212. In embodiments in which the displayed image 212 is of a computer simulation, the information data 232 may include one or more of the game's name, teams and/or players in the game and/or screenshot, game statistics, equipment used by players in the game, descriptions of the game map associated with the displayed image 212, the in-game location of the user when the image is capture, scores of teams and/or player in the game at the time the image is capture, a game session identifier, etc. For example, in a racing game as shown in FIG. 2, the information data 232 may include information about the players/drivers, the cars each player is driving, the track, the speed and/or location of each car when the screenshot is captured, etc. In another example, in an image captured in a multi-player shooter game, the information data 232 may include information about the players, the teams, each player's weapons, the battle field map, player locations, and scores at the time the screenshot is captured, etc. Generally, information data 232 may be any state information from a computer software application.

When the image file 231 is captured, an optically machine readable code 233 may be automatically generated based on the information data 232. The information data 232 that is encoded into the optically machine readable code 233 may include all or a subset of all information recorded during the capture of the image file 231. The optically machine readable code 233 may include other previously recorded and/or entered information.

In some embodiments, the optically machine readable code 233 includes a pointer to web based content associated with the image file 231. For example, the optically machine readable code 233 may include a URL or a unique identifier that can be interpreted by software or a website to redirect a user to web content associated with the image file 231. The web based content may include at least part of the information data 232 and/or a digital copy of the image file 231. The web based content may further include a user interface for users to comment on, share, print, order a physical copy, and/or download the image file 231.

In some embodiments, the optically machine readable code 233 includes data readable by the software application associated with the displayed image 212. The software application may be configured to perform action based on the information data 232 and/or a unique identifier in the optically machine readable code 233. For example, a computer simulation software may be configured to encode player information and player in-game locations into an optically machine readable code when a screenshot is taken of its displayed image. When a user either opens the image using the software application or scans the image with an image sensor on a device with the game installed on its memory, the game may be configured to open a profile of the team and/or the player, provide detail information and/or purchase options for the equipments and maps, bring a player character to a map or location associated with the image file 231, etc. In some embodiments, the game software may provide a replay of at least a portion the game session associated with the image file 231. In some embodiments, the optically machine readable code 233 may function similar to a "save file" in a computer simulation, allowing a user to load and/or view one or more game states associated with the captured image into his/her instance of the computer simulation.

While the optically machine readable code 233 is shown as a QR code in FIG. 2, the optically machine readable code 133 may be one or more of a barcode, a linear barcode, a quick response (QR) code, an Aztec code, a high capacity color barcode, and a matrix barcode. Generally, the optically machine readable code 233 may be any image encoding data that is optically readable by an optical sensor to retrieve the encoded data. The optically machine readable code 233 may be generated by the software application providing the displayed image 212, a plug-in component of the software application providing the displayed image 212, a separate software application, and/or a firmware or operating system of the user device 210.

The image file 231 and the optically machine readable code 233 are associated with each other and stored in the storage memory 234. The storage memory 234 may be a local memory device of the user device 210, a removable memory device, and/or cloud-based storage. The image file 231 and the optically machine readable code 233 may be stored as two separate but associated images or be combined into one image file and stored in the storage memory 234. Examples of images combining the image file 231 and the optically machine readable code 233 are provided with reference to FIG. 4 below.

Figure 3:
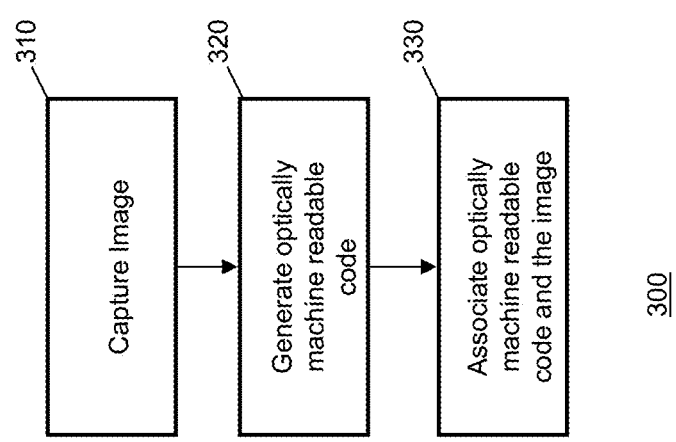
FIG. 3 is a flow diagram illustrating a method for automatically generating an optically machine readable code for a captured image in accordance with some embodiments of the present invention.

Referring to FIG. 3, there is illustrated an example of a method 300 for automatically generating an optically machine readable code for a captured image. In some embodiments, steps of method 300 may be performed by one or more server devices, a user device, or a combination of server and user devices. Generally, the steps of method 300 may be performed by one or more processor-based devices such as a camera, a smartphone, a hand-held gaming device, a wearable device, a game console, a laptop, a tablet computer, a desktop computer, and the like.

In step 310, an image is captured. The image may be captured with an optical sensor such as a camera or may be a screenshot capture. During the capturing of the image, information relating to the image is recorded by the capturing device. In some embodiments, the recorded information may include one or more of a capture location, a capture time, a capturing device, a photographer, and an identity of one or more people in the photograph. In some embodiments, the recorded information may include one or more of a time, a virtual location in the computer simulation, and an identity of one or more participants in a screen capture. In some embodiments, the recorded information may include one or more of a score, game statistics, and game specific data of a computer simulation. In some embodiments, the recorded information may include at least some of the information typically recorded in the meta-data of an image file. Other examples of information that may be recorded during the capturing of an image are described above with reference to information data 132 in FIG. 1 and information data 232 in FIG. 2. Yet other types of information may be recorded without departing from the spirit of the present disclosure.

In step 320, an optically machine readable code is generated. The optically machine readable code may be one or more of a barcode, a linear barcode, a quick response (QR) code, an Aztec code, a high capacity color barcode, and a matrix barcode. Generally, the optically machine readable code may be any image encoding data that is optically readable by an optical sensor to retrieve the encoded data. The optically machine readable code may be generated by a software application, a firmware/operating system of the user device, a plug-in component of an image capture software, and/or the software application providing the displayed image on a user device. The optically machine readable code may include at least a portion of the information relating to the image that is recorded in step 310. The optically machine readable code may further include other information entered by the user.

In some embodiments, the optically machine readable code includes a pointer to web based content associated with the captured image. For example, the optically machine readable code may include an URL or a unique identifier that can be interpreted by a software or a website to direct a user to web content associated with the image file. The web based content may include at least part of the information and/or image recorded in step 310. The web based content may further include a user interface for users to comment on, share, print, order a physical copy, and/or download the image file. In such embodiments, after step 310, the user device may automatically generate a unique identifier for the image file and upload the identifier along with the image file and/or at least some of the information data to an image sharing server that provides the web based content. The image sharing server may then generate the web content based on the uploaded information. The unique identifier in the optically machine readable code may include a first portion identifying at least one of the user and/or the user device and a second portion identifying the image file.

The web based content for the captured image may be associated with a user profile based on the first portion identifying at least one of the user and/or the user device. The user may then edit the image and/or information data displayed in the web based content as well as control access to the web based content associated with the image by logging into the image sharing service with the user profile. In some embodiments, the optically machine readable code includes a pointer to the web based content and a pass code needed to access the web based content such that only persons with access to the machine readable code can access the web based content. Generally, the web based content may include features similar to typical image sharing services, with the optically machine readable code serving as a link between physical and digital versions of a captured image. For example, a user may scan the optically machine readable code on a printed photo with an optical reader and/or a camera and be directed to a user interface associated with that image. The user may then interact with other users and/or a digital copy of that image via the user interface of the web based content. In another example, a user may see an image shared on a third party website, scan the optically machine readable code on that image, and be able to retrieve additional details about that image and/or be directed to another web resource that provides additional information about the image.

In some embodiments, the optically machine readable code is readable by the software application associated with the image captured in a screenshot in step 310. In such embodiments, the optical machine readable code may be configured to cause the software application to perform an action when the code is read. For example the software application may load and/or render for viewing various software states recorded in the optically machine readable code. In a computer simulation, for example, the software application may display more detailed information relating to the simulation session captured in the image file. The software application may allow a user to interact with various elements in the simulation session captured in the image file inside the computer simulation. In some embodiments, the software application may load an entire simulation session based on a session identifier and/or in-game time information encoded in the optically machine readable code. In some embodiments, other software may perform actions when an optically machine readable code is read. For example, mapping software may read an optically machine readable code including location information and display the location at which the image is captured to the user on the user device.

In some embodiments, the optically machine readable code is encoded with one of the standard optically readable code encoding schemes (e.g. Barcode, QR code, etc.). In some embodiments, the encoding of the optically machine readable code may be standardized across platforms and devices. In some embodiments, the optically machine readable code may have proprietary encoding that is only readable by specific software applications. In some embodiments, the optically machine readable code may be encoded in such as way that a pass code is required to decode its content. The optically machine readable code may include one or both of information data and a pointer to a net accessible source containing information data.

In step 330, the optically machine readable code generated in step 320 is associated with the captured image and stored. In some embodiments, the image and the optically machine readable code may be stored as two separate but associated images. In some embodiments, the captured image and the optically machine readable code may be combined into one image file and stored in the storage memory. Examples of images combining the image file and the optically machine readable code are provided with reference to FIG. 4 below. In some embodiments, one or more of the captured image, information recorded in step 310, the optically machine readable code, and an image combining the captured image and the machine readable code are associated and stored in a computer readable storage medium.

In some embodiments, after step 330, users may be permitted to modify one or more of the recorded information and the generated optically machine readable code. In some embodiments, the user may be able to select and/or modify how the image file and the optically machine readable code are combined. For example, a user interface may be provided to the user to select and/or modify the placement of the optically machine readable code, the type of optically machine readable code, and/or the information to include in the optically machine readable code. The user interface may provide other conventional image editing functions. Once the user's selection and modification is completed, the user interface may provide a new image combining the captured image and the optically machine readable code. In some embodiments, once the image is captured 310, the user device generates an image combining the captured image and the optically machine readable code without further user input.

In some embodiments, steps 320 and 330 may be performed by a device other than the device that captured the image in step 310. For example, a capturing device may send the captured image and the recorded information data related to the image to a server or another processor based device. The receiving device may then generate the optically machine readable code using the information data recorded by the capturing device with any other information entered by the user. For example, a conventional camera may capture an image file and metadata and transfer the image file to a personal computer or a server. An application on the computer or the server may then automatically encode at least some of the information in the metadata recorded by the camera into an optically machine readable code. In some embodiments, the application may generate and add other information to the optically machined readable code. For example, the application may perform facial recognition on the image to identify subjects of the image and include the names of the subjects in the optically machined readable code. In some embodiments, the user can add other information and/or modify the optically machine readable code via the application. For example, in some embodiments the user can add or modify information manually using the application. Thus, in some embodiments an optically machine readable code may be generated for any image regardless of the device used to capture the image.

Figure 4:
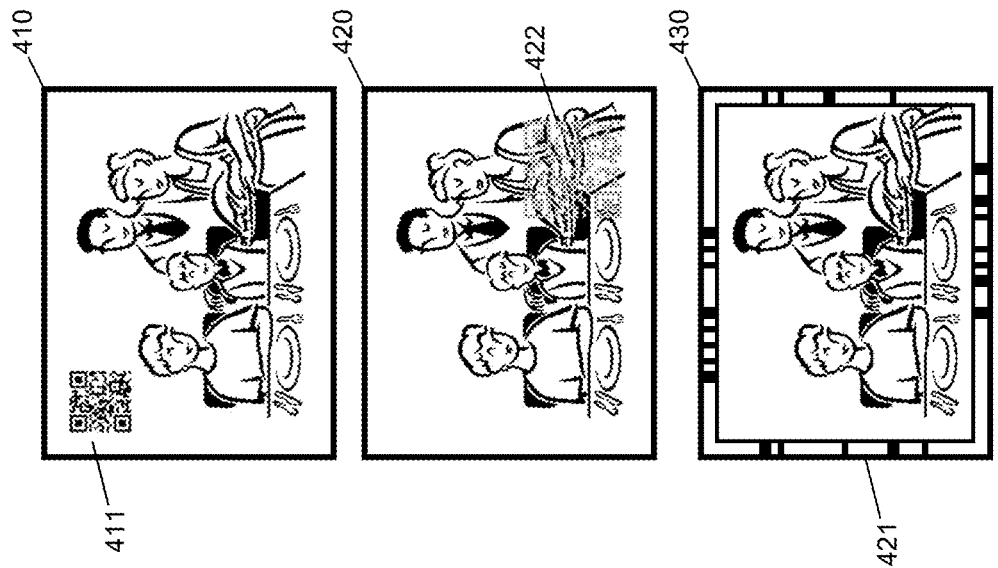
FIG. 4 shows examples of captured images combined with optically machine readable codes in accordance with some embodiments of the present invention.

Referring to FIG. 4, there is shown three examples of images including a captured image and an optically machine readable code encoding information relating to the captured image. In the first image 410, an optically machine readable code 411 is overlaid on the captured image. In some embodiments, the placement of the optically machine readable code 411 is fixed. In some embodiments, a software application automatically determines a region in the image to place the optically machine readable code 411 as to not obstruct the primary persons and/or object in the image. In some embodiments, the software application also automatically determines a suitable dimension for the code. In some embodiments, the placement and/or the dimensions of the optically machine readable code 411 may be configurable by the user before and/or after the photo is captured.

In the second image 420, an optically machine readable code 422 is blended into the image. The optically machine readable code 422 may be imbedded in the image similar to a watermark such that the image overlapping the optically machine readable code 422 is at least partially visible to a viewer of the image. The optically machine readable code 422 may be imbedded in the image by changing one or more of a color, brightness, and saturation of the pixels of the image overlapping the code. In some embodiments, the placement of the optically machine readable code 422 is fixed. In some embodiments, a software application automatically determines a region in the image with relatively flat colors to place the optically machine readable 422. In some embodiments, the placement of the optically machine readable code 422 may be configurable by the user before and/or after the photo is captured. While the optically machine readable code 411 and the optically machine readable code 422 are shown as QR codes in FIG. 4, they may be any optically machine readable code described herein.

In the third image 430, an optically machine readable code 421 is included in the border portion or frame of the image. While the third image 430 shows 2-D codes in all four sides of the board, any type of optically machine readable code 421 may be placed in the one or more sides of the border. In some embodiments, each side (up, down, left, and right) of the border may correspond to a different portion of the encoded information. For example, a first side may include a unique identifying number for the image and a second side may include a unique identifying number for the device or the photographer. In another example, a first side may include information relating to the subjects of the photograph, and a second side may include information relating to the location of the capture. While FIG. 4 shows an image with a white border surrounding an image, the border may be of any color, and may only be present on one, two, or three edges of the image. For example, the border may be a strip at the bottom of the image including one or more 2D or 3D optically machine readable codes.

The first image 410, the second image 420, and the third image 430 are provided as examples only. An optically machine readable code may be combined with a captured image in other ways without departing from the spirit of the present disclosure. For example, the optically machine readable code may be printed on the back of the image, placed next to the image in a collage of multiple images, etc.

Figure 5:
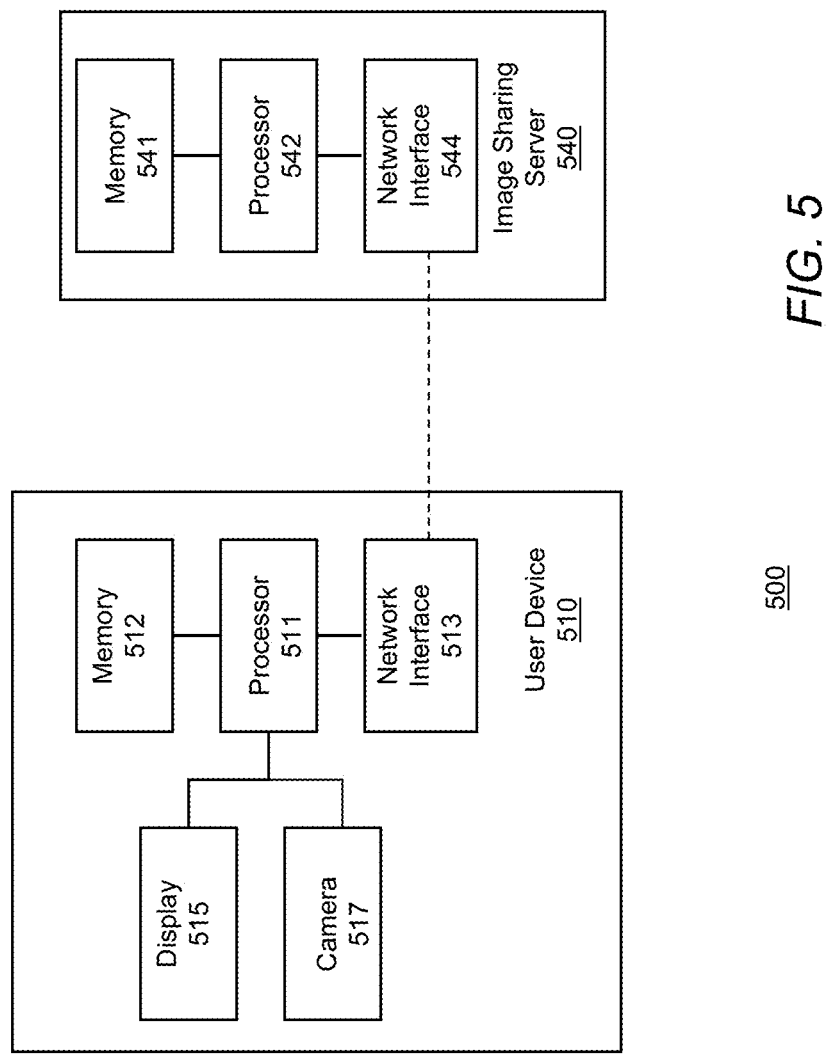
FIG. 5 is a block diagram illustrating a system that may be used to run, implement, and/or execute any of the methods and techniques shown and described herein in accordance with the embodiments of the present invention.

FIG. 5 is a block diagram illustrating a system that may be used to run, implement and/or execute any of the methods and techniques shown and described herein in accordance with some embodiments of the present invention. The system 500 includes a user device 510 having a memory 512 and a processor 511. In some embodiments, the user device 510 further includes one or more of a network interface 513, a display 515, a camera 517, and one or more user input devices (not shown). In some embodiments, the user device 510 further includes other environmental sensors such as a GPS receiver, a light sensor, etc. Generally, the user device 510 may be any device configured to capture a real-world scene and/or a displayed image such as a camera, a Smartphone, a wearable device, a tablet computer, a laptop computer, a desktop computer, a game console, and the like.

The memory 512 may include one or more a volatile and/or non-volatile computer readable memory devices. The memory 512 has stored upon it, computer executable codes that causes the processor 511 to automatically generate an optically machine readable code when an image is captured with the device. The processor 511 may further combine the captured image with the optically machine readable code to generate an image according to one or more of a default setting and user configuration.

In some embodiments, the user device 510 includes a network interface 513 configured to communicate with an image sharing server 540. The image sharing server 540 includes a memory 541, a processor 542, and a network interface 544. When an image is captured with the user device 510, in some embodiments, the user device 510 may communicate with the image sharing server 540 to generate the optically machine readable code. In some embodiments, the user device 510 uploads one or more of the captured image, information recorded during the capturing of the image, and the optically machine readable code to the image sharing server 540. The uploading may be performed automatically immediately after the capture or may be performed with a time delay. For example, the user device 510 may upload the captured image when it is connected to wi-fi. Upon receiving the uploaded information from the user device 510, the image sharing server 520 may generate web based content based on the received information. For example, the image sharing server may provide a user interface for the captured image that allow other users to view, comment on, edit, and/or order the image. In some embodiments, the uploaded information includes a user identifier associated with the photographer, and the image sharing server 540 automatically associates the uploaded information and/or image with a profile of the user. The image sharing server 540 may further allow the user to log in to a user profile to modify and control access of all images associated with the user. The user interface may be accessible via one or more of a web-browser and an associated application ("app"). The image sharing server 540 may support a plurality of user devices and other devices used to access the user interfaces associated with various images. In some embodiments, when a device is used to read the optically machined readable code, the device contacts the image sharing server to obtain information data related to the associated image file. The information data may be provided in any format configured to be displayed at the device.

In some embodiments, the image sharing server 540 or another device may provide a user interface for users to configure how the information data associated with the image is combined with the image prior to the image being printed, shared, and/or downloaded. For example, using the user interface, a user may be able to select whether to embed the optically machine readable code in the image, in the frame of the image, or obtain two separate images. In some embodiments, the user may select to have the optically machine readable code, or the decoded information from the optically machine readable code, included on the back of a printed image, or on a separate paper. For example, a software application may send instructions to a printer to print the image on the front of a paper and print the optically machine readable code or the decoded information on the back of the paper, or on a separate paper. In some embodiments, the image sharing server 540 may include or be associated with a photo printer to provide the capability of printing images and information. Thus, in some embodiments the image sharing server 540 is capable of associating and/or combining machine readable codes with images and printing the codes and images as well. In some embodiments, the photo printer may comprise a personal printer or a printer located in a shopping center or similar location.

While the system 500 is shown to include a user device 510 and an image sharing server 540, in some embodiments, the user device 510 is configured to operate without an image sharing server 540. For example, in some embodiments, the generated optically machine readable code contains only information data and no web based content pointer. In such embodiments, information data may be transmitted via the optically machine readable code alone, and the user device 510 does not upload the information to a separate server. That is, the optically machine readable code may be decoded using a software application without the need to access a server. For example, a decoder application may decode the optically machine readable code and display capture location, capture time, photographer, etc. information based solely on the data encoded in the optically machine readable code. Thus, in some embodiments the optically machine readable code can be decoded offline using a photo viewer or other application that is configured to decode the optically machine readable code. In some embodiments, the user device 510 and the image sharing server 540 may communicate via other intermediary devices. For example, in a user device 510 with a network interface 513, the user device 510 may be connected to a computer with Internet access to upload the images to the image sharing server 540.

Figure 6:
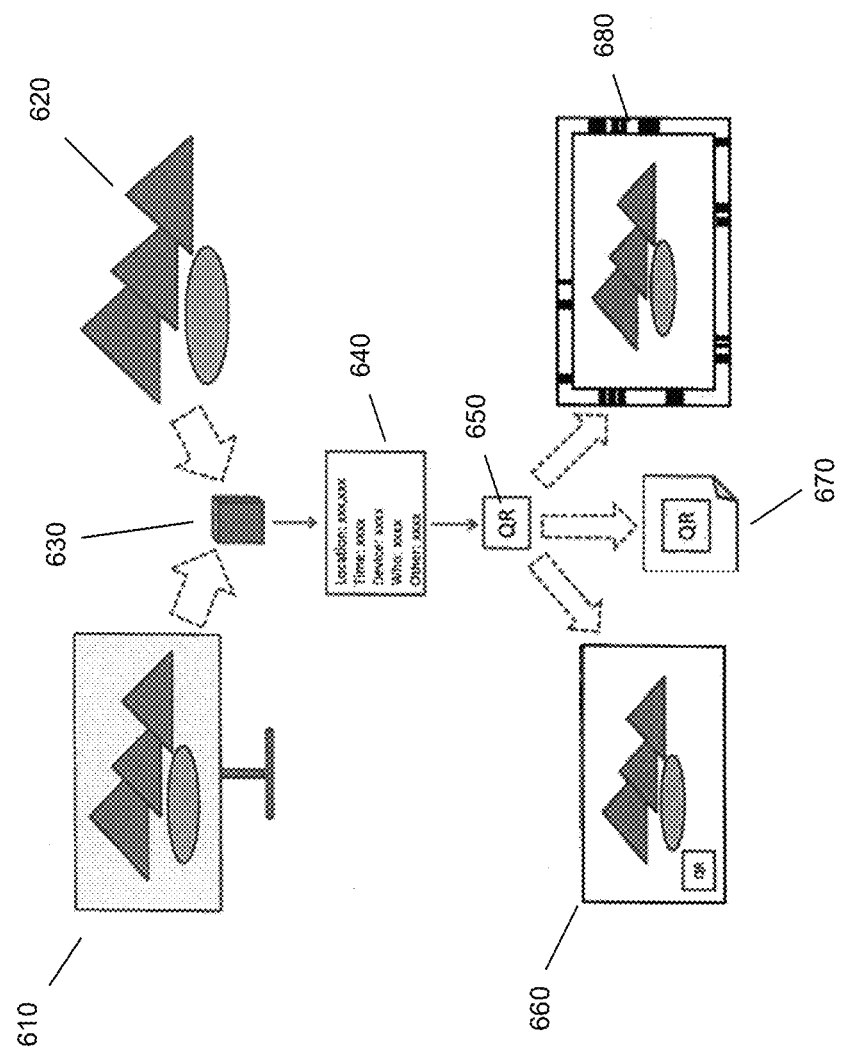
FIG. 6 is a block diagram illustrating a process of generating and combining optically machine readable codes and captured images.

Referring to FIG. 6, there is shown a diagram showing the generating of optically machine readable codes for captured images. User device 630 is configured to capture an image of one or more of a real world scene 620 and a displayed image 610. The user device 630 also records information data 640 about the captured image during the capture. The information data 640 may further include some information previously stored in the memory of the user device 630 prior to the capturing. At least a portion of the information data 640 is encoded into an optically machine readable code 650. While a QR code is shown, the optically machine readable code 650 may be other types of codes described herein. After the code is generated, the code may be automatically embedded into an image file of the captured image 660, saved as a separate image 670, or added to a border area of the captured image 680. Other ways of associating and/or combining the captured image and the optically machine readable code 650 may be implemented without departing from the spirit of the present disclosure.

In some embodiments, one or more of the embodiments, methods, approaches, and/or techniques described above may be implemented in one or more computer programs or software applications executable by a processor based apparatus or system. By way of example, such processor based system may comprise the processor based apparatus or system 500, or a computer, entertainment system, game console, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted to cause a processor based apparatus or system to execute steps comprising: capturing an image with a user device, automatically generating, by the user device, an optically machine readable code comprising information about the image recorded during the capturing of the image, and associating the optically machine readable code and the image.

While the invention herein disclosed has been described by means of specific embodiments and applications thereof, numerous modifications and variations could be made thereto by those skilled in the art without departing from the scope of the invention set forth in the claims.

What is claimed is:
1. A method comprising:
capturing an image with a user device;
generating, by the user device, a unique identifier for the image;
automatically generating, by the user device, an optically machine readable code comprising information about the image recorded during the capturing of the image and the unique identifier;
associating the optically machine readable code and the image;
uploading information associated with the image to a server; and
wherein the unique identifier comprises a pointer to web based content automatically generated by the server based on the information associated with the image and uploaded by the user device.

2. The method of claim 1, further comprising:
combining the optically machine readable code with the image such that the optically machine readable code is readable by an optical sensor when the image is viewed.

3. The method of claim 2, wherein the optically machine readable code is encoded into a border portion of the image.

4. The method of claim 2, wherein the optically machine readable code is encoded over pixels of the image.

5. The method of claim 1, wherein the image comprises a photo captured with a camera.

6. The method of claim 5, wherein the information about the image comprises one or more of a capture location, a capture time, a capturing device, a photographer, and an identity of one or more people in the image.

7. The method of claim 1, wherein the image comprises a screenshot capture.

8. The method of claim 7, wherein the screenshot capture comprises a capture of a computer simulation, and the information about the image comprises one or more of a time, a virtual location in the computer simulation, and an identity of one or more participants.

9. The method of claim 8, wherein the computer simulation comprises a computer game, and the information about the image comprises one or more of score, game statistics, and game specific data.

10. The method of claim 1, wherein the pointer comprises one or more of a universal resource locator (URL) and a unique identifier of the image.

11. The method of claim 1, wherein the optically machine readable code further comprises a pass code needed to access the web based content.

12. The method of claim 1, wherein the optically machine readable code comprises one or more of a barcode, a linear barcode, a quick response (QR) code, an Aztec code, a high capacity color barcode, and a matrix barcode.

13. A non-transitory computer readable storage medium storing one or more programs that causes a processor based system to execute steps comprising:
capturing an image with a user device;
generating, by the user device, a unique identifier for the image;
automatically generating, by the user device, an optically machine readable code comprising information about the image recorded during the capturing of the image and the unique identifier;
associating the optically machine readable code and the image;
uploading information associated with the image to a server; and
wherein the unique identifier comprises a pointer to web based content automatically generated by the server based on the information associated with the image and uploaded by the user device.

14. The computer readable storage medium of claim 13, wherein the one or more programs further causes the processor based system to execute steps comprising:
combining the optically machine readable code with the image such that the optically machine readable code is readable by an optical sensor when the image is viewed.

15. The computer readable storage medium of claim 13, wherein the image comprises a photo captured with a camera; and
wherein the information about the image comprises one or more of a capture location, a capture time, a capturing device, a photographer, and an identity of one or more people in the image.

16. The computer readable storage medium of claim 13, wherein the image comprises a screenshot capture of a computer simulation, and the information about the image comprises one or more of a time, a virtual location in the computer simulation and an identity of one or more participants.

17. The computer readable storage medium of claim 13, wherein the optically machine readable code comprises one or more of a barcode, a linear barcode, a quick response (QR) code, an Aztec code, a high capacity color barcode, and a matrix barcode.

18. An apparatus comprising:
an image capture device configured to capture an image;
a processor configured to:
generate a unique identifier for the image;
automatically generate an optically machine readable code comprising information about the image recorded during the capturing of the image and the unique identifier;
associate the optically machine readable code and the image; and
upload information associated with the image to a server; and
a non-transitory computer readable storage medium configured to store the image and the optically machine readable code;
wherein the unique identifier comprises a pointer to web based content automatically generated by the server based on the information associated with the image and uploaded by the user device.

* * * * *